US011141883B2

United States Patent
Steiner et al.

(10) Patent No.: US 11,141,883 B2
(45) Date of Patent: Oct. 12, 2021

(54) APPARATUS AND METHOD FOR MAKING A RUBBER FINISH MIXTURE CONTAINING AT LEAST ONE REACTIVE ADDITIVE

(71) Applicant: Continental Reifen Deutschland GmbH, Hannover (DE)

(72) Inventors: Frank Stefan Steiner, Hannover (DE); Fabian Dettmer, Braunschweig (DE)

(73) Assignee: Continental Reifen Deutschland GmbH, Hannover (DE)

( * ) Notice: Subject to any disclaimer, the term of this patent is extended or adjusted under 35 U.S.C. 154(b) by 404 days.

(21) Appl. No.: 16/005,505

(22) Filed: Jun. 11, 2018

(65) Prior Publication Data

US 2018/0290337 A1    Oct. 11, 2018

Related U.S. Application Data

(63) Continuation of application No. PCT/EP2016/072145, filed on Sep. 19, 2016.

(30) Foreign Application Priority Data

Dec. 10, 2015  (DE) .......................... 102015224798.8

(51) Int. Cl.
*B29B 7/24*  (2006.01)
*B29B 7/74*  (2006.01)
(Continued)

(52) U.S. Cl.
CPC .............. *B29B 7/246* (2013.01); *B29B 7/183* (2013.01); *B29B 7/244* (2013.01); *B29B 7/7466* (2013.01);
(Continued)

(58) Field of Classification Search
CPC ..... B28C 7/0422; B01F 15/0445; B29B 7/24; B29B 7/242; B29B 7/246; B29B 7/603; B29B 7/7466; B29B 7/7485; B29B 7/7495
See application file for complete search history.

(56) References Cited

U.S. PATENT DOCUMENTS 4,910,237 A * 3/1990 Peter ..................... B29B 7/7495
523/351
5,011,291 A   4/1991 Peter
(Continued)

FOREIGN PATENT DOCUMENTS

CN   204450834 U   7/2015
DE     4342115 C1   4/1995
(Continued)

OTHER PUBLICATIONS

International Search Report dated Nov. 16, 2016 of international application PCT/EP2016/072145 on which this application is based.
(Continued)

*Primary Examiner* — Elizabeth Insler
(74) *Attorney, Agent, or Firm* — David L. Cate; Gregory Adams

(57) ABSTRACT

The invention is directed to an apparatus for making a finished rubber mixture which includes a reactive additive. The apparatus includes a tandem mixer with an upper machine having an upper mixing chamber and a lower machine having a lower mixing chamber. The lower mixing chamber is larger than the upper mixing chamber and there are rotors disposed in each mixing chamber. Mixture components are introduced into the lower mixing chamber via a loading shaft of a loading unit. The loading unit has at least two metering devices, a cutting or preheating unit connected upstream of a metering device and a first conveyor belt to the loading shaft. All conveyor belts of the apparatus can be
(Continued)

switched on and off automatically, such that mixture components weighed in can be held in a "wait position" thereon.

4 Claims, 2 Drawing Sheets

(51) Int. Cl.
   *B29B 7/18* (2006.01)
   *B29B 7/82* (2006.01)
   *B29B 7/88* (2006.01)

(52) U.S. Cl.
   CPC .......... *B29B 7/7485* (2013.01); *B29B 7/7495* (2013.01); *B29B 7/82* (2013.01); *B29B 7/885* (2013.01)

(56) References Cited

U.S. PATENT DOCUMENTS

| | | | |
|---|---|---|---|
| 5,108,188 A | 4/1992 | Peter et al. | |
| 5,183,640 A | 2/1993 | Peter et al. | |
| 5,368,383 A | 11/1994 | Peter et al. | |
| 5,415,823 A * | 5/1995 | Peter | B29B 7/7461 264/175 |
| 6,828,361 B2 | 12/2004 | Peter et al. | |

FOREIGN PATENT DOCUMENTS

| | | |
|---|---|---|
| DE | 4407144 A1 | 7/1995 |
| EP | 0618055 A1 | 10/1994 |
| GB | 606167 A | 8/1948 |
| JP | S60165078 A | 8/1985 |
| JP | H04216014 A | 8/1992 |
| JP | H10119036 A | 5/1998 |

OTHER PUBLICATIONS

Peter J. et al: "Tandem-Mischverfahren. Teil 5: Einsatz Bei Technischen Gummiwaren. Tandem Mixing. Part 5: Application to Technical Rubber Goods", Kautschuk Gummi Kunststoffe, Huethig Verlag, Heidelberg, DE, vol. 47, No. 9, Sep. 1, 1994, pp. 666-671, XP000444726, ISSN: 0948-3276.

Bogun, Martin: Untersuchungen zur kontinuierlichen Herstellung von Kautschukmischungen basierend auf Rubber/Filler-Composites am Doppelschneckenextruder, Diss., Martin-Luther-Universitaet Halle-Wittenberg, Sep. 29, 2005, XP-002763350, pp. 7 to 32.

Overview of Polymer Additives Technology and Information, Volume of Rubber compounding agents, Oct. 1989, Chemical Auxiliary Science and Technology Information Centre of the Ministry of Chemical Industry.

* cited by examiner

US 11,141,883 B2

APPARATUS AND METHOD FOR MAKING A RUBBER FINISH MIXTURE CONTAINING AT LEAST ONE REACTIVE ADDITIVE

CROSS REFERENCE TO RELATED APPLICATION

This application is a continuation application of international patent application PCT/EP2016/072145, filed Sep. 19, 2016, designating the United States and claiming priority from German application 10 2015 224 798.8, filed Dec. 10, 2015, and the entire content of both applications is incorporated herein by reference.

FIELD OF THE INVENTION

The invention relates to an apparatus for production of a finished rubber mixture comprising at least one reactive additive, comprising a tandem mixer with an upper machine having an upper mixing chamber and a lower machine having a lower mixing chamber, where the lower mixing chamber is larger than the upper mixing chamber and there are rotors disposed in each mixing chamber, where a loading unit by means of which mixture components can be introduced into the lower mixing chamber via a loading shaft has been provided.

The invention further relates to a process producing a finished rubber mixture comprising reactive additives.

BACKGROUND OF THE INVENTION

It is known and customary to produce rubber mixtures via at least two mixing stages, base mixing and finish mixing. During the production of the base mixture, all components of the rubber mixture, such as rubbers, fillers, processing auxiliaries, aging stabilizers, antiozonants and further customary additives except for the crosslinking chemicals, are mixed with one another while introducing energy. After the base mixture has been finished, cooled down and possibly stored, the finished rubber mixture is produced by mixing in the crosslinking chemicals at relatively low temperature.

Typically, rubber mixtures, irrespective of their intended field of use, are mixed in tandem mixers which, as known from U.S. Pat. No. 5,183,640 for example, have an upper machine comprising an upper mixing chamber and a lower machine comprising a lower mixing chamber, where the lower mixing chamber is larger than the upper mixing chamber and there are rotors disposed in each mixing chamber. Various processes for producing base mixtures and also finished mixtures by means of tandem mixers are known, for example, from DE 44 07 144 A1, U.S. Pat. No. 6,828,361 or EP 0 618 055 B1.

In the production of non-reactive rubber mixtures, that is, those rubber mixtures where no chemical reactions are to take place in the course of the mixture production, tandem mixers enable coupling of base mixing and finish mixing processes by controlled cooling of the base mixture manufactured in the upper machine and by the supply of the typical crosslinking chemicals into the mixing chamber of the lower machine for finish-mixing.

Among the reactive mixtures, the silica-containing rubber mixtures are of major importance owing to their use in modern motor vehicle tires. In the production of rubber mixtures of this kind is too customary, for improvement of the processibility of the rubber mixture and for attachment of the polar silica to nonpolar rubbers, to use what are called coupling agents which react with the polar groups of silica and enable binding to the rubber. Such coupling agents are, for example, bifunctional organosilanes which have at least one alkoxy, cycloalkoxy or phenoxy group as leaving group on the silicon atom and have, as further functionality, a group which can, optionally after dissociation, enter into a chemical reaction with the double bonds of the polymer.

Even though it is customary to configure the mixing chamber of the lower machine with greater volume compared to the mixing chamber of the upper machine, the rubber mixtures are currently cooled down only relatively slowly in the mixing chamber of the lower machine, and so the mixing time is considerably prolonged and the throughput is distinctly limited. Currently, the weighing of the individual mixture components which is to be conducted takes so much time that the throughput is limited by the tandem mixer and hence the productivity as well.

SUMMARY OF THE INVENTION

It is therefore an object of the invention to provide an apparatus and a method of the type specified above, by means of which a rubber mixture comprising at least one reactive additive can be mixed with a higher throughput than before.

With regard to the apparatus, the stated object is achieved in accordance with the invention in that the loading unit has at least two metering devices, at least one cutting or preheating unit connected upstream of a metering device and a first conveyor belt that leads to the loading shaft, where one metering device has a first conveying unit for transport of mixture components to the first conveyor belt and the other metering device has a second conveying unit for transport of mixture components to a second conveyor belt that leads to the first conveyor belt, where all conveyor belts can be switched on and off automatically, such that mixture components weighed in can be held in a "wait position" thereon.

With regard to the process, the stated object is achieved in accordance with the invention in that, in a first stage, in an upper machine, rubber and the at least one reactive additive are used to produce a base mixture in a batchwise manner, and, in a second stage, the base mixture is finish-mixed with addition of vulcanization chemicals likewise in a batchwise manner, where the base mixture is finish-mixed at a temperature suitable for production of finished rubber mixtures in the lower machine without leaving the overall mixing unit composed of upper and lower machines and shaping aggregate.

By means of the two metering devices provided, multiple mixture components can be weighed in simultaneously. The upstream cutting or preheating unit enables comminution or preheating of any rubber, such that it can be initially charged in the lower mixing chamber at the desired temperature and consistency, which assures effective cooling of the base mixture. Because the mixture components can be held in "wait positions", it is possible, for example, for coupling agents and subsequently crosslinking chemicals to be weighed out in one metering device, while, for example, further mixture components required for production of the base mixture and the rubber to be initially charged are weighed out in the other metering device. Due to the initial charging of rubber, the finished base mixture, immediately after completion thereof, has an ideal mixing temperature for finish mixing, and so the crosslinking chemicals weighed in that are already in "wait position" on one of the conveyor belts can be added immediately to the finished base mixture. The loading unit of the invention therefore makes a crucial contribution to an increase in throughput by the tandem mixer, since the weighing times for the mixture components no longer limit the throughput.

It has been found that, surprisingly, by means of the apparatus of the invention and the process of the invention, it is also possible to mix reactive rubber mixtures where chemical reactions proceed in the course of the mixture production in a tandem mixer which permits coupling of base mixing and finish mixing processes. The apparatus of the invention enables production of a finish mixture by controlled cooling of the base mixture manufactured in the upper machine and by the metered addition of the typical crosslinking chemicals and further mixture components into the mixing chamber of the lower machine.

Preferably, the loading unit is configured such that mixture components can be added overall in an amount corresponding to up to 75%, especially 5% to 40%, of the mass of the finished rubber mixture. It is therefore possible to conduct a majority of the mixing operation in the larger lower mixing chamber, such that the optimal temperature for finish mixing is achieved more quickly than before, such that the throughput can additionally be increased.

In a preferred embodiment, the conveying units of the metering devices and the conveyor belts are operable, that is, stoppable and restartable, by means of one or more light barrier(s).

Preferably, the conveying units of the metering devices each have a conveyor belt.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
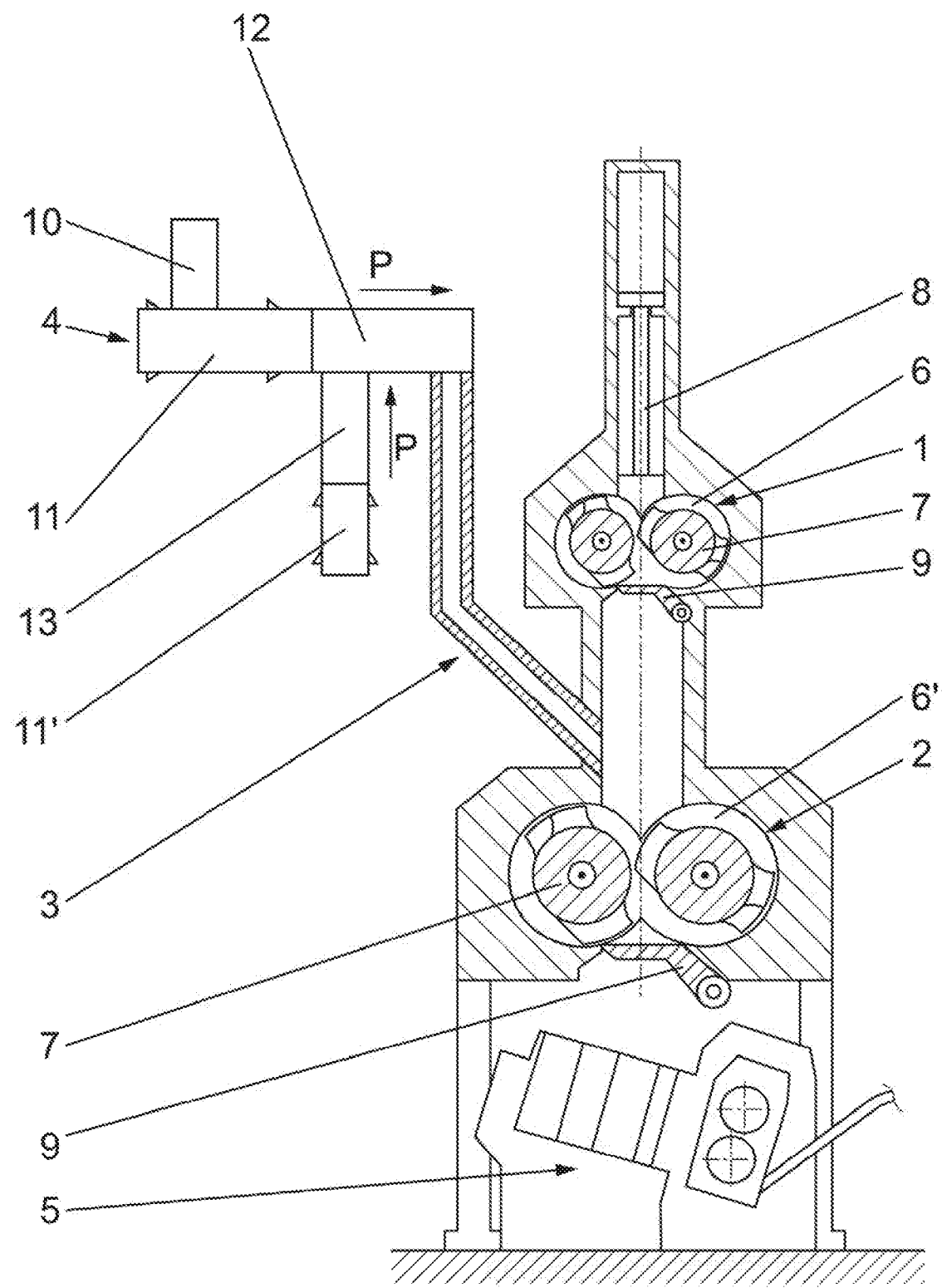
FIG. 1 is a schematic of an apparatus for making a finished rubber mixture; and, FIG. 2 shows an example of a mixing curve for a mixing process conducted with the apparatus from FIG. 1.

The apparatus shown in FIG. 1 includes a tandem mixer having an upper machine 1, a lower machine 2 and a loading shaft 3, and also a loading unit 4. Below the tandem mixer there is disposed a shaping aggregate 5, for example a roller system or a "twin-screw roller head extruder".

The upper machine 1 has an upper mixing chamber 6, and the lower machine 2 a lower mixing chamber 6', where the lower mixing chamber 6' is larger than the upper mixing chamber 6 and there are two rotors 7 executed in a manner known per se in each mixing chamber 6, 6'. The upper machine 1 also has a ram 8 to which pressure is applied, which is arranged above the upper mixing chamber 6 and which can be moved up and down in a manner known per se. In FIG. 1, the ram 8 is in its down position, in which mixture present in the upper mixing chamber 6 can be forced toward the corresponding rotors 7.

Each mixing chamber 6, 6' has a pivotable discharge valve 9. By opening the discharge valve 9 of the upper mixing chamber 6, mixture from the upper mixing chamber 6 can be transferred into the lower mixing chamber 6'. By opening the discharge valve 9 of the lower mixing chamber 6', the mixture is introduced into the shaping aggregate 5 and then rolled to the desired thickness by means thereof. The rolled rubber mixture is processed further according to its end use; for example, the rubber mixture, for subsequent manufacture of a tread of a pneumatic vehicle tire, is extruded in sheet form in a manner known per se.

Figure 2:
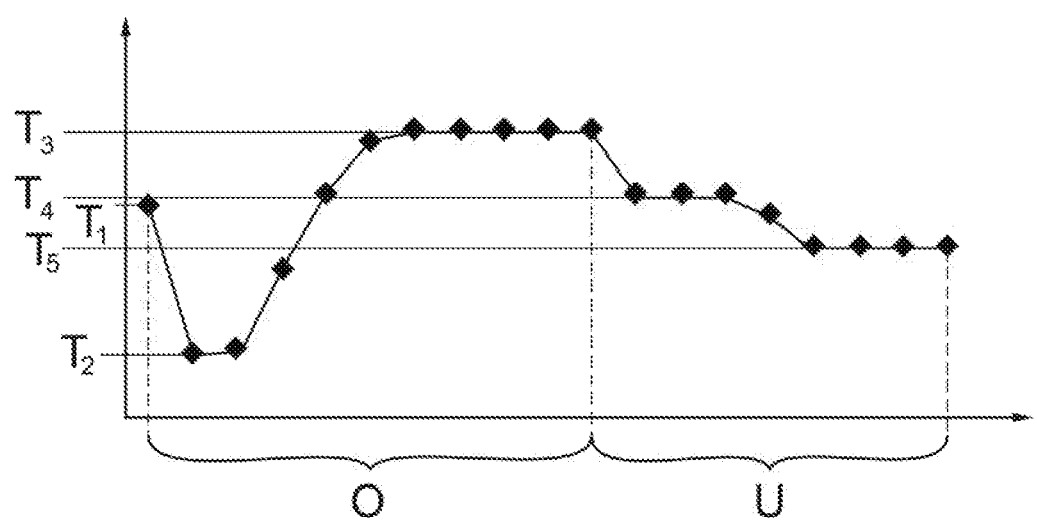

The mixing curve shown in FIG. 2 shows, by way of example, the profile of the mixing temperature (temperature in the respective mixing chamber 6, 6') as a function of time for the mixing operation comprising the base mixing and the finish mixing of a batch, with the mixing temperature plotted on the abscissa axis and the mixing time on the ordinate axis. The section identified by "O" in the mixing curve is that part of the mixing operation which takes place in the upper mixing chamber 6; the section identified by "U" characterizes the part of the mixing operation that takes place in the lower mixing chamber 6'.

The base mixing of the rubber mixture is effected, as elucidated hereinafter, partly in the upper mixing chamber 6 and partly in the lower mixing chamber 6'; the finish mixing is effected in the lower mixing chamber 6'. By means of the loading unit 4, it is possible to apply mixture components to the lower mixing chamber 6' via the loading shaft 3.

In the course of the base mixing, the rubber components and fillers intended for the corresponding rubber mixture, especially carbon blacks and/or silicas, are introduced into the upper mixing chamber 6, especially in a manner known per se. The temperature ($T_1$) in the upper mixing chamber 6 is generally 60° C. to 150° C., the temperature $T_1$ depending especially on how long ago the last mixing operation was conducted. After lowering the ram 8, the mixture components introduced are mixed with one another by the rotors 7 that are already running. As shown by the mixing curve in FIG. 2, the mixing temperature at the start of the mixing operation decreases continuously to a mixing temperature $T_2$ of, for example, about 60° C. (section O). The speed of the rotors 7 of the upper machine 1 is chosen such that the shear forces introduced into the mixture by the rotors 7 bring about a rise to a mixing temperature $T_3$ of 120° C. to 200° C. The mixing temperature $T_3$ and the underlying energy input through the rotors 7 assure optimal mixing-in, that is, distribution (dispersion), of the fillers into the rubber components. Moreover, the mixing temperature $T_3$ is ideally suited to conduction of silanization reactions of the silicas.

After the fillers have been mixed in, the mixture is transferred into the lower mixing chamber 6' and further mixture components, which especially include plasticizers, processing actives, aging stabilizers, antiozonant wax, zinc oxide and stearic acid, are added to the mixture via the loading shaft 3, and the base mixture is produced. For finish mixing, the crosslinking chemicals, which preferably include sulfur and at least one accelerator, are added. Preferably, the speed of the rotors 7' is reduced immediately before or immediately after the addition of the further mixture components; good dispersibility of the further mixture components ensures high quality of mixing. The mixing-in of the further mixture components with simultaneous reduction in the speed of the rotors 7' is advantageous since this accelerates the reduction of the mixing temperature (mixing temperature $T_4$).

For finish mixing of the mixture, it is necessary to reduce the mixing temperature to a value $T_5<T_4$, such that premature crosslinking after addition of the crosslinking chemicals is prevented. For this purpose, it is advantageous, for example, prior to the transfer of the mixture from the upper mixing chamber 6 into the lower mixing chamber 6', to initially charge the lower mixing chamber 6' with thermally stable mixture components. For example, a rubber provided in the particular rubber base mixture or a rubber powder already containing sulfur or the like can be included in the initial charge. In addition, the rubber can be premixed together with sulfur, or the rubber together with antiozonant wax or another mixture component having good distributability in the rubber, in the lower mixing chamber 6' ("prebatch"). These procedures promote the subsequent cooling of the mixture in the lower mixing chamber 6'.

The initial charging of thermally stable mixture components and the addition of the further mixture components and the crosslinking chemicals is effected by means of the special loading unit 4 via the loading shaft 3, with addition of mixture components overall in an amount corresponding to up to 75%, especially 5% to 40%, of the mass of the finished rubber mixture.

The loading unit 4 shown in schematic form in FIG. 1 has a cutting or preheating unit 10, two metering devices 11, 11', a conveyor belt 12 that leads to the loading shaft 3, and a conveyor belt 13 that leads from the metering device 11' to the conveyor belt 12. The transport directions of the two conveyor belts 12, 13 are each identified by an arrow P. The metering devices 11, 11' likewise each have one conveying unit especially comprising one conveyor belt, such that mixture components weighed in by means of the metering units 11, 11' are transportable to the conveyor belts 12, 13.

The mixture components provided for the respective rubber mixture are optionally comminuted and/or heated by means of the cutting or preheating unit 10 arranged upstream of the metering device 11 and then weighed in the metering device 11. The amounts desired in each case are conveyed to the conveyor belt 12, subsequently to the loading shaft 3, and via the latter into the lower mixing chamber 6'. The crosslinking chemicals are weighed out in the second metering device 11' and can then be conveyed via the conveyor belt 13 to the conveyor belt 12 and subsequently into the lower mixing chamber 6'.

The conveyor belts 12, 13 are stopped automatically if required. If, for example, a first batch is being finish-mixed in the lower mixing chamber 6', while the base mixture of a second batch is being mixed in the upper mixing chamber 6, the mixture components required for finish mixing for the second batch and any thermally stable mixture components to be initially charged can be weighed out and optionally cut to size or preheated and transported onto the conveyor belt 12. The conveyor belt 12 is stopped, such that the respective mixture components are briefly in a wait position. If the first batch present in the lower mixing chamber 6' has been finish-mixed, it is introduced into the shaping aggregate 5. Any mixture components to be initially charged are introduced into the lower mixing chamber 6 and mixed. Subsequently, the second batch present in the upper mixing chamber 6 is transferred into the lower mixing chamber 6' and the already prepared mixture components present on the conveyor belt 12 are added thereto via the loading shaft 3. The second batch can therefore be effectively cooled down immediately after it has been transferred into the lower mixing chamber 6' and then finish-mixed, such that particularly rapid progress of the batchwise mixing procedure is ensured and there is accordingly a rise in productivity. The conveyor belts 12, 13 are preferably controlled by means of one or more light barrier(s) which ensure(s) appropriate stopping and starting of the conveyor belts 12, 13.

It is understood that the foregoing description is that of the preferred embodiments of the invention and that various changes and modifications may be made thereto without departing from the spirit and scope of the invention as defined in the appended claims.

LIST OF REFERENCE NUMERALS (Part of the Description)
 1 Upper machine
 2 Lower machine
 3 Loading shaft
 4 Loading unit
 5 Shaping aggregate
 6, 6' Mixing chambers
 7 Rotor
 8 Ram
 9 Discharge valve
 Cutting or preheating unit
 11, 11' Metering device
 12, 13 Conveyor belt
 P Transport direction

What is claimed is:

1. An apparatus for making a finished rubber mixture including at least one reactive additive, said apparatus comprising:
 a tandem mixer including an upper machine for mixing a base mixture and having an upper mixing chamber, and a lower machine including a lower mixing chamber;
 said lower mixing chamber being larger than said upper mixing chamber;
 first and second sets of rotors being disposed in said upper and lower mixing chambers, respectively;
 a loading unit including a loading shaft via which mixture components are introduced into said lower mixing chamber;
 said loading unit further including: at least first and second metering devices; at least one cutting or preheating unit connected upstream of one of said metering devices; and, a first conveyor belt leading to said loading shaft;
 said first metering device having a first conveying unit for transport of mixture components to the first conveyor belt;
 said second metering device having a second conveying unit for transport of crosslinking chemicals to a second conveyor belt that leads to said first conveyor belt; and,
 said conveyor belts being configured to be switched on and off automatically so that mixture components weighed in can be held in a "wait position" thereon;
 wherein said upper machine and said lower machine are housed in one structure;
 wherein said base mixture, said mixture components and said crosslinking chemicals are different mixtures; and,
 wherein said first metering device and said second metering device enable said mixture components and said crosslinking chemicals to be weighed simultaneously.

2. The apparatus of claim 1, wherein said mixture components and said crosslinking chemicals are added via said loading unit into said lower mixing chamber in an amount corresponding to up to 75% of the mass of the finished rubber mixture.

3. The apparatus of claim 1, wherein said mixture components and said crosslinking chemicals are added overall via said loading unit into said lower mixing chamber in an amount corresponding to 5% to 40% of the mass of the finished rubber mixture.

4. The apparatus of claim 1, wherein said first conveyor belt and said second conveyor belt are controlled by one or more light barrier(s).

\* \* \* \* \*